(12) United States Patent
Fitzpatrick et al.

(10) Patent No.: US 9,507,676 B2
(45) Date of Patent: Nov. 29, 2016

(54) CLUSTER CREATION AND MANAGEMENT FOR WORKLOAD RECOVERY

(71) Applicant: International Business Machines Corporation, Armonk, NY (US)

(72) Inventors: Michael G. Fitzpatrick, Raleigh, NC (US); Brian J. Lang, Holly Springs, NC (US); Linwood H. Overby, Jr., Raleigh, NC (US); Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/573,277

(22) Filed: Dec. 17, 2014

(65) Prior Publication Data

US 2016/0179636 A1    Jun. 23, 2016

(51) Int. Cl.
*G06F 11/00*     (2006.01)
*G06F 11/20*     (2006.01)
*G06F 9/50*      (2006.01)

(52) U.S. Cl.
CPC ......... *G06F 11/203* (2013.01); *G06F 11/2023* (2013.01); *G06F 9/5005* (2013.01); *G06F 9/5066* (2013.01); *G06F 2201/805* (2013.01); *G06F 2201/86* (2013.01)

(58) Field of Classification Search
CPC ............. G06F 11/203; G06F 11/2023; G06F 9/5005; G06F 9/5066
See application file for complete search history.

(56) References Cited

U.S. PATENT DOCUMENTS

| | | | |
|---|---|---|---|
| 7,900,206 B1* | 3/2011 | Joshi | G06F 9/505 709/223 |
| 8,112,758 B2* | 2/2012 | Jain | G06F 9/5005 711/170 |
| 8,321,870 B2* | 11/2012 | Messier | G06F 9/5066 709/201 |
| 2007/0078982 A1* | 4/2007 | Aidun | G06F 11/2025 709/225 |
| 2011/0022882 A1* | 1/2011 | Jaehde | G06F 11/2023 714/4.1 |
| 2013/0007772 A1* | 1/2013 | Arcudi | G06F 11/3692 719/320 |
| 2013/0060933 A1 | 3/2013 | Tung et al. | |
| 2014/0173246 A1* | 6/2014 | Sandstrom | G06F 9/5027 712/15 |
| 2015/0227426 A1* | 8/2015 | Andrade Costa | G06F 11/1415 714/47.3 |

OTHER PUBLICATIONS

Mell, P., et al., "The NIST Definition of Cloud Computing", Recommendations of the National Institute of Standards and Technology Special Publication 800-145. Sep. 2011. 7 pages.

* cited by examiner

*Primary Examiner* — Yolanda L Wilson
(74) *Attorney, Agent, or Firm* — Brian Welle

(57) ABSTRACT

Aspects of the disclosure relate to managing migration of one or more applications from a primary computing device to recovery computing devices using a controller. Resource data that includes application resource requirements and resource capacities is monitored. An application exists as a single instance on the primary computing device. A recovery cluster for the application consisting of recovery computing devices is determined. A division of the application into a plurality of application instances is identified. In response to the resource data being updated, a new recovery cluster is determined. In response to the new recovery cluster, a new plurality of application instances is identified. Once a triggering event on the primary computing device is detected, the controller migrates the new application instances to the new recovery cluster. Other uses of the disclosure are possible.

20 Claims, 8 Drawing Sheets

CLUSTER CREATION AND MANAGEMENT FOR WORKLOAD RECOVERY

BACKGROUND

The present disclosure relates to computer systems, and more specifically, to managing a migration of an application from a primary computing device to recovery computing devices using a controller.

In modern computing architectures, workloads for applications are often processed on a first computing device on a computing network. The computing network usually contains multiple other computing devices. Occasions exist where the processing of the workloads may be migrated from the first computing devices to one or more of the other computing devices on the computing network. Depending upon the application workloads and the other computing devices on the network, different methods for choosing the other computing devices and processing the application workloads can be used.

SUMMARY

Aspects of the disclosure relate to managing a migration of an application from a primary computing device to recovery computing devices. In embodiments, an application may be migrated due to a triggering event on the primary computing device. The application may be initially run as a single application instance on the primary computing device. The migration may be managed by embodiments of a controller. The controller may monitor resource data. The resource data may include application resource requirements for the application. The resource data may also include resource capacities of potential recovery computing devices.

A first recovery cluster for the application may be determined. The first recovery cluster may be determined based upon the capacities of the potential recovery computing devices. The recovery devices of the first recovery cluster may satisfy the application resource requirements. The controller may identify a first division of the single application instance. The division may divide the application into a first plurality of application instances. The resource data may be updated. In response to the resource data being updated, a second recovery cluster may be determined. The second recovery cluster, like the first recovery cluster, may be comprised of recovery computing devices. In response to determining the second recovery cluster, the controller may identify a second division of the application. The application may be divided into a second plurality of application instances. The controller may detect a triggering event. The triggering event may relate to the ability of the primary computing device to process the application. In response to the triggering event, the controller may migrate the second plurality of application instances to the second recovery cluster.

Embodiments may include creation of a data-sharing environment. The controller may create the data-sharing environment for the second recovery cluster, resulting in a logical data-sharing cluster. The second recovery cluster may use the data-sharing environment to route data requests and client requests. The controller may structure the data-sharing environment to route requests through the controller. Requests may be routed through the controller to mask the second recovery cluster as a single device to the client. Requests may be routed through the controller to facilitate coordination between a set of application instances running on different computing devices of the second recovery cluster.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
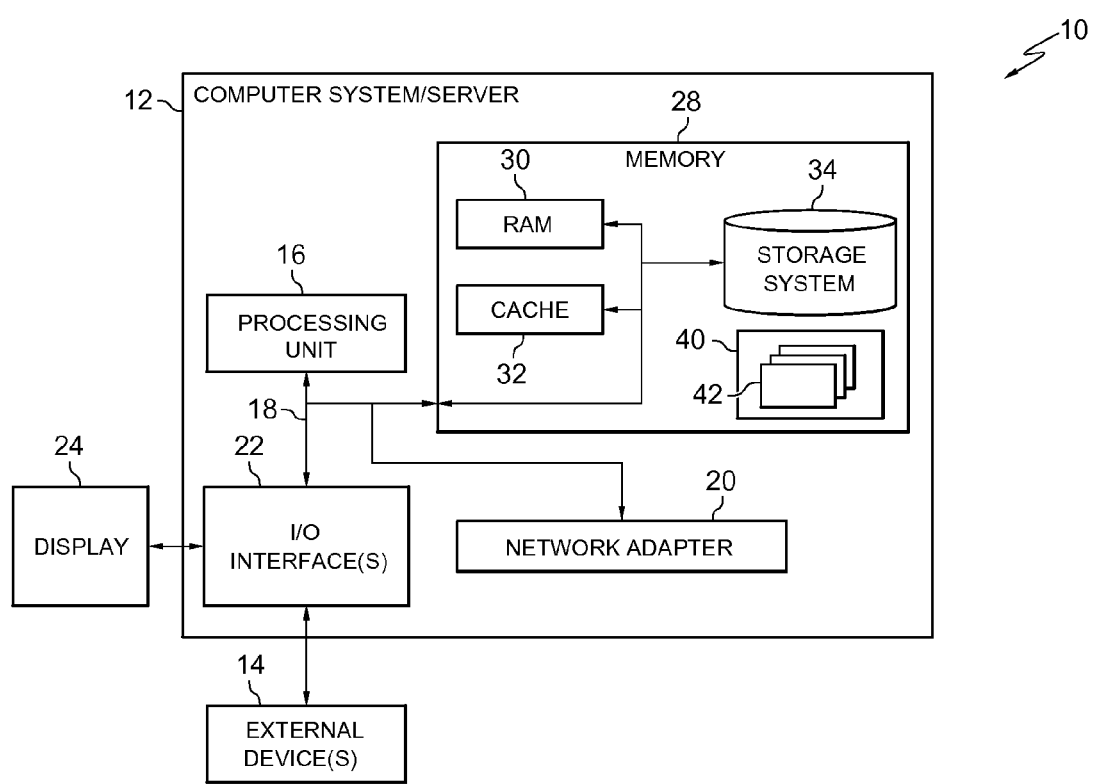
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to dynamically managing migration of an application from a primary computing device to recovery computing devices. In embodiments, an application may be migrated due to a disaster/triggering event on the primary computing device. The migration may be managed by embodiments of a controller. In embodiments, the computing devices are connected through a cloud computing environment, and the controller is a cloud controller. In such embodiments, the controller may include an application migration module to manage the functionality as described herein.

The application may be initially run as a single application instance on the primary computing device. The controller may monitor resource data. In embodiments, resource data is the required resources for running the application and the available resources of the primary computing device and the potential recovery computing devices. The resource data may include application resource requirements for the application (e.g., processing requirements or virtual/real memory requirements). The resource data may also include resource capacities of potential recovery computing devices (e.g., processing capacities or virtual/real memory capacities). In embodiments, the resource capacities are computing resources available for running the application.

A first recovery cluster for the application may be determined. The first recovery cluster may be determined based upon the capacities of the potential recovery computing devices. The recovery computing devices of the first recovery cluster may satisfy the application resource requirements. In embodiments, the recovery computing devices are the computing devices which make up the recovery cluster and eventually run the application after the triggering event. The controller may identify a first division of the single application instance. In embodiments, the first division is a breakdown of the single application instance into a set of application sub-instances. The first division may divide the application into a first plurality of application instances, in some embodiments into a first plurality with the same number of instances as the number of devices in the first recovery cluster. The resource data may be updated (e.g., the application needs additional processing requirements, a few of the potential recovery computing devices have less capacity, etc.). In response to the resource data being updated, a second recovery cluster may be determined. In embodiments, the second recovery cluster takes into account the updates to the resource data. The second recovery cluster, like the first recovery cluster, may be comprised of a plurality of recovery computing devices. In response to determining the second recovery cluster, the controller may identify a second division of the application. In embodiments, the second division is a breakdown of the single application instance into a set of application sub-instances. The application may be divided into a second plurality of application instances. In embodiments, the controller may regularly check for current capacities and requirements, determining a new recovery cluster and identifying a new application division in response to certain updates to computing device capacity and application resource requirements.

The controller may detect a triggering event. The triggering event may relate to the ability of the primary computing device to process the application. In response to the triggering event, the controller may migrate the second plurality of application instances to the second recovery cluster. In order to run the application as a plurality of application instances, the controller may structure communication pathways in such a way as to create a shared environment.

In some instances, recovery solutions may have a one-to-one relationship between an initial/primary computing device processing an application workload and an additional computing device enabling recovery from the primary computing device encountering a triggering event. The one-to-one relationship may make recovery difficult if the additional computing device has fewer system resources. Additionally, if the additional device is used predominantly for backup of the primary computing device, the resources of the additional device may be underutilized.

Aspects of the disclosure are directed towards a one-to-many relationship between a primary system/primary computing device and recovery computing devices available for recovery from a triggering event. The one-to-many relationship may be enabled by a controller. The controller may be aware of, and monitor, the application(s) being run on the primary computing device (e.g., the primary computing device's workload). By monitoring the primary computing device, the controller may identify the current requirements of the application. The controller may also monitor the primary computing device's access to the data.

The controller may identify computing devices within the local network or cloud environment. The controller may identify these computing devices dynamically (e.g., by regularly investigating the devices connected to the local network or cloud environment) or through configuration (e.g., by regularly checking predetermined computing devices at predetermined locations within the system architecture of the local network or cloud environment). The controller may register the computing devices as potential recovery computing devices in the event that the primary computing device encounters a disaster/outage/triggering event. In embodiments, the potential recovery computing devices may be spread across multiple sites. The controller may monitor connectivity to the potential recovery computing device and track the available resource capacities of the potential recovery computing devices. The controller may regularly determine a recovery cluster for the primary computing devices based on the current capacities of the computing devices and the current requirements of the application. The recovery cluster may consist of those computing devices of the potential recovery computing devices which have enough capacity to process a portion of the primary computing device's application workload.

A triggering event may be a disaster, outage, or other occurrence where the primary computing device is not able to run the application as specified/required/desired. The triggering event may relate to the resource capacities of the primary computing device. In embodiments, the triggering event may include a failure to meet either processing requirements or memory requirements. In certain embodiments, the triggering event may include the primary computing device losing at least some access to the set of data, the primary computing device becoming unavailable, or the application workloads on the primary computing device otherwise failing. The controller may establish the application requirements (e.g., processing/memory requirements) by analyzing the resources usage of the application over time. Once a triggering event is encountered by the primary computing device, the controller may migrate the application workload to application instances running on the recovery computing systems and load balances across them.

Once the application has been migrated to the recovery cluster, the controller may act as an access point to data for the application instances. As this access point, the controller may dynamically enable shared access to the data. The controller may also serve as an access point to the application instances for a client sending client requests for the specific application. The controller may act as an access point for client and data requests by treating the recovery cluster as a logical cluster. Using the controller as an access point may reduce the need for the application to be coded or configured for data sharing with other application instances. Using the controller as an access point may also result in data reliability benefits and workload processing availability benefits. For example, the data-sharing environment may result in fewer overwritten files or unmerged parallel files. In some embodiments, the controller may migrate multiple applications in response to the triggering event. In such embodiments, the controller may perpetuate data sharing cluster across the multiple applications to enable data sharing between the multiple instances of the workload's application residing on the recovery computing devices.

In certain embodiments, the controller could use known algorithms for handling the load balancing between the recovery computing devices. In such embodiments, the controller might use such algorithms to ensure that new application workload requests are distributed across the available recovery computing devices based on their current capacity. Serialized access to the data from each of these application instances on the recovery computing devices may also be handled by the controller.

In embodiments, the recovery computing devices of the recovery cluster may have served as initial processing devices for other application workloads. In such embodiments, the recovery cluster may still process the other application workloads after the triggering event. The recovery cluster may have significant geographical distance between the primary computing device and the recovery computing devices. The recovery computing devices of the recovery cluster may not need to have the exact same resource capacities or specifications as the primary computing device in order to be utilized by the controller. In other words, the recovery computing devices/system do not need to be of the same size (processor/capacity-wise) as the system in the primary computing device/site. The controller may migrate multiple application instances across these smaller systems to serve as recovery computing devices to a larger primary computing device.

In embodiments, the dynamically nature of the creation of the recovery cluster allows the controller to take into account fluctuating resource capacities across recovery computing devices. For example, perhaps the controller is monitoring a server A which is running an application which requires 100 resource units. The controller may concurrently be monitoring servers B, C, D, and E. While monitoring servers B, C, D, and E, the controller may determine that none of the servers individually have 100 resource units, but collectively they easily surpass 100 resource units. The controller may detect that, at a moment in time, server A can no longer provide 100 units. The controller may look at servers B, C, D, and E, and—determining that a combination of these servers can provide 100 units based upon the resource capacity of those servers at that moment in time—create a recovery cluster that is logically clustered with said combination. As discussed, the controller may create this recovery cluster with a data-sharing environment to run the application as if it were on a single server.

In embodiments, a set of data for the application may be located geographically external to the primary computing device. In embodiments, being located geographically external means occupying a different physical location than the physical location being referred to, whether the physical location is a server, a room, or a building. Locating the data external to the primary computing device may result in positive resiliency benefits by reducing the likelihood that a single triggering event can impact both resource capacities and data access. Embodiments may also locate the controller external to the primary computing device. Locating the controller external to the primary computing device may decrease the likelihood that a triggering event on the primary computing device could negatively impact the capabilities of the controller.

Aspects of the disclosure are directed towards positive benefits to performance, efficiency, or reliability of recovery devices. The data-sharing environment may provide positive performance impacts in processing workloads, as the data-sharing environment does not require any application or client "awareness." Specifically, a client using an application which is processed on the recovery cluster may only see the single point of requests and access (e.g., the controller) rather than the one or more recovery computing devices (e.g., the recovery cluster). If a client only sees the controller, the client may be "unaware" of the one or more computing devices in the data-sharing environment which are processing application workloads. At the same time, an application which was not written for data-sharing may still be processed by computing devices in the data-sharing environment. This may be because the controller, acting as the single point of requests and access, will render the multiple devices from the perspective of the application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
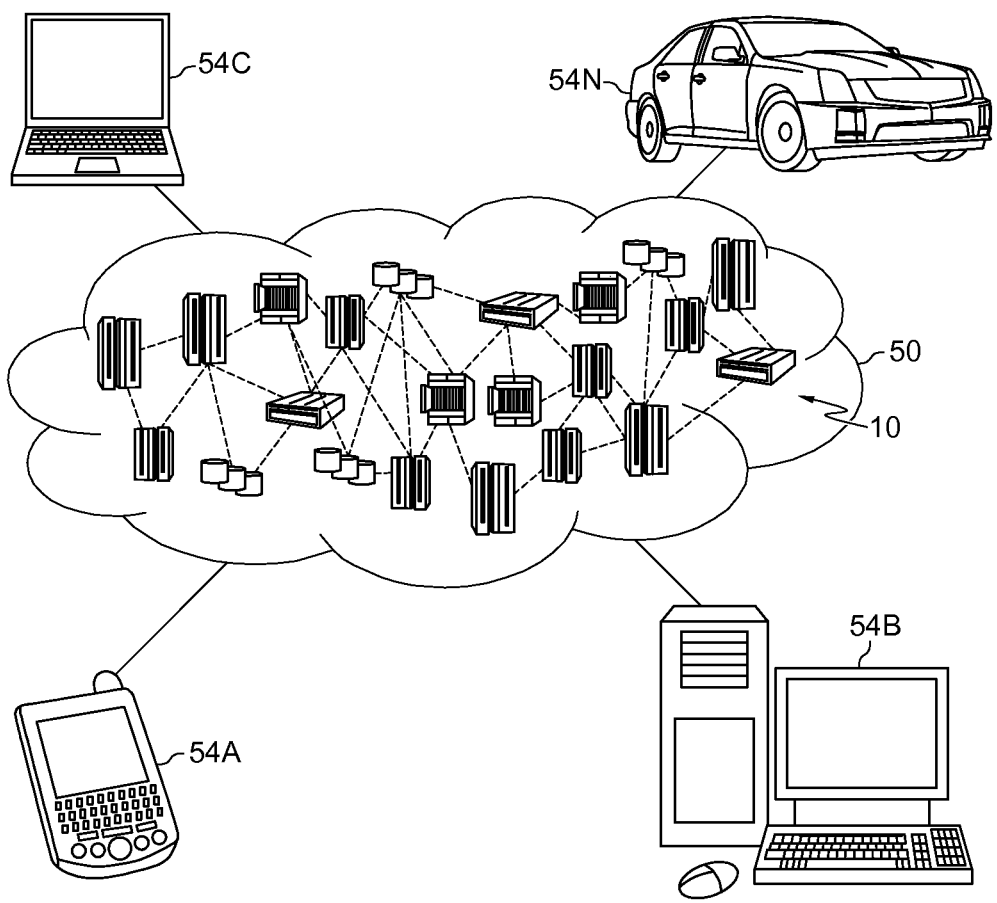
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
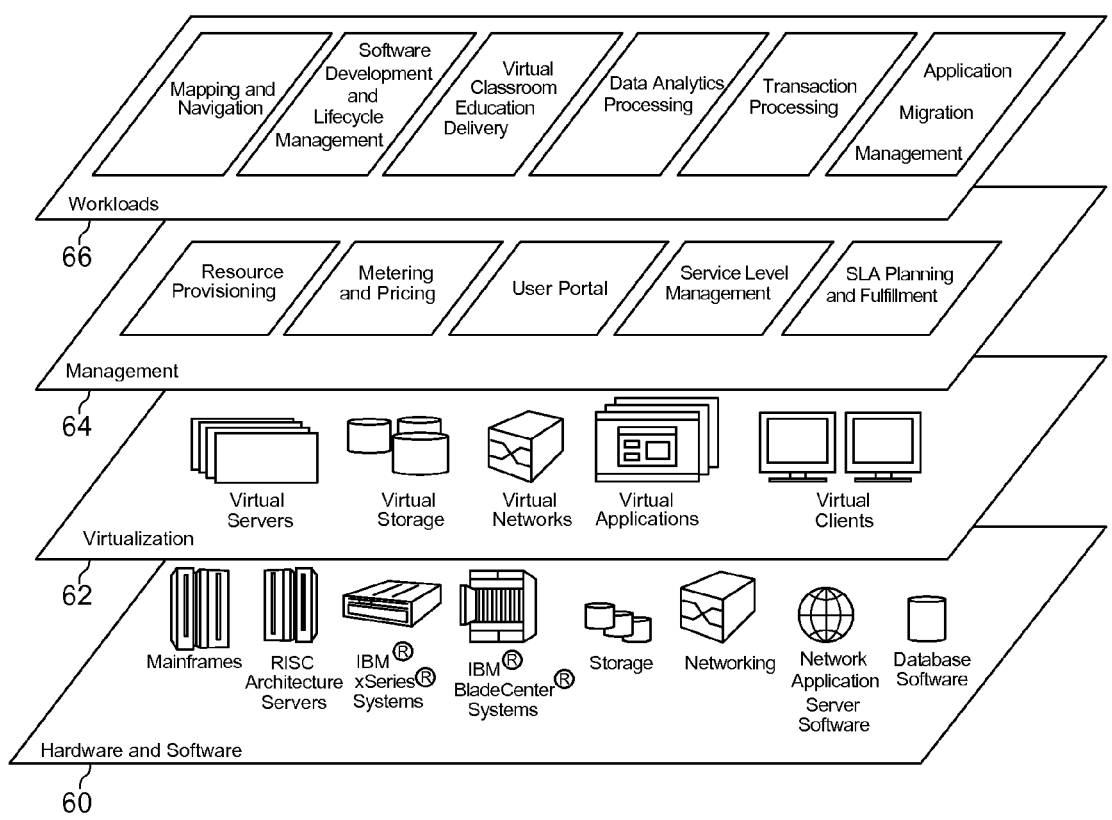
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, Series, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and application migration management. A migration, in response to a triggering event, could be managed by a controller. In certain embodiments, the controller may manage the migration within a cloud computing environment. The controller may migrate an application to a recovery cluster which can process the application. The recovery cluster may be composed of recovery computing devices connected through a cloud computing environment. The controller may transfer the application through the cloud computing environment. A set of data for processing the application workloads may be accessed through the cloud computing environment.

Figure 4:
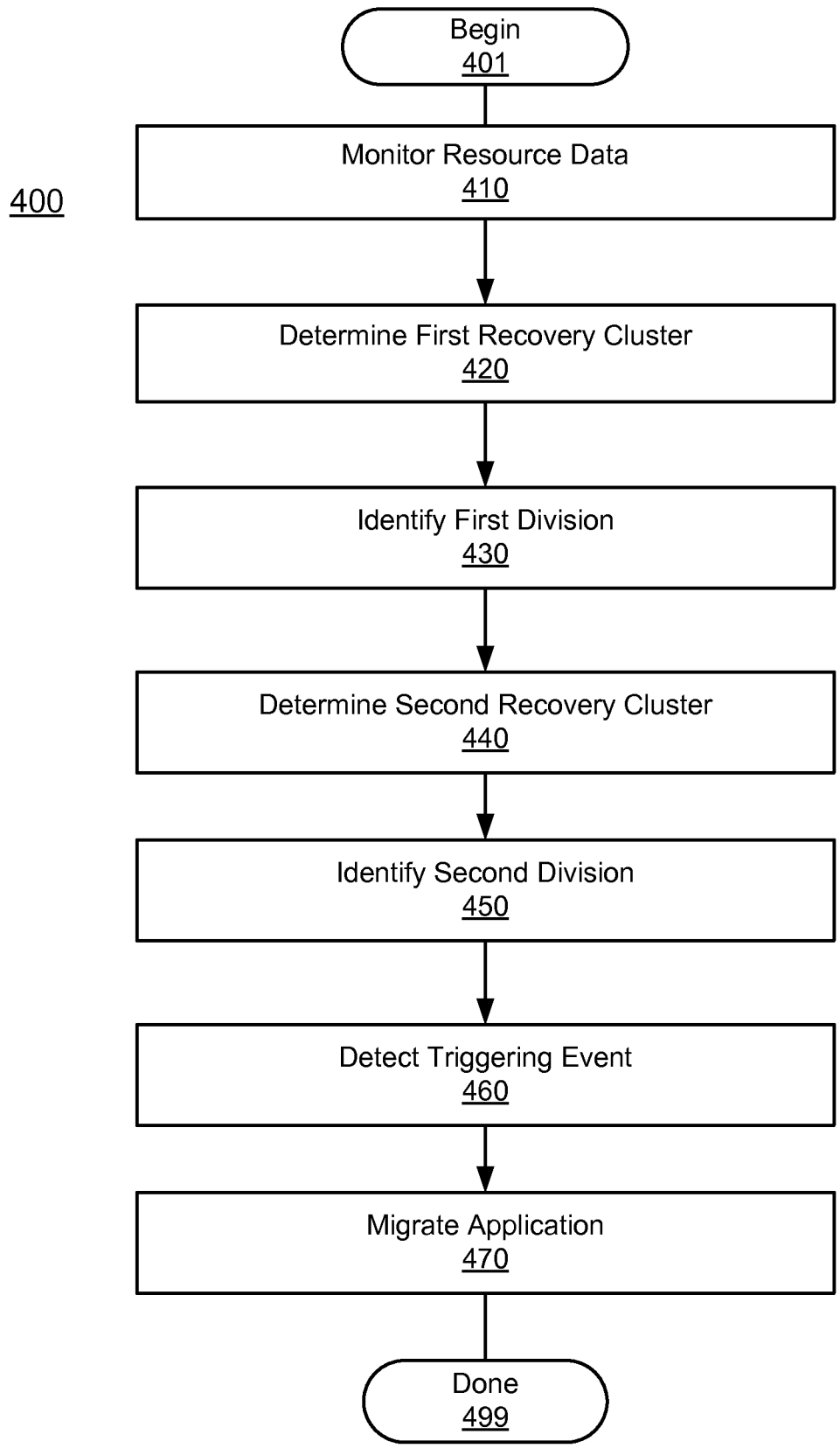
FIG. 4 depicts a method of managing a migration of an application from a primary computing device to recovery computing devices according to embodiments.

FIG. 4 is a flowchart illustrating a method 400 for managing a migration of application workloads from a primary computing device to recovery computing devices according to embodiments. Aspects of method 400 begin at block 401. The primary computing device may run the application. The application may be arranged throughout the network/cloud computing environment in many ways. For example, in some embodiments, the application does not reside on the potential recovery computing devices until the triggering event occurs. In other embodiments, the application may reside on the potential recovery computing devices prior to the triggering event, but is not started until the triggering event occurs. In other embodiments, the application both resides and is started on the recovery systems prior to the triggering event.

The migration may be managed by a controller. The controller may be located external to both the primary computing device and the recovery computing devices (e.g., the controller is in a different facility or on a different server than the computing devices). In certain embodiments, a secondary controller may be used as a redundant controller. The redundant controller may be external to (e.g., geographically separate from) the controller. In the event that the triggering event impacts the controller, the secondary controller may be used as the controller as described herein. In some embodiments, the potential recovery computing devices and the primary computing device are connected over a cloud computing environment, and the controller is a cloud controller. In such embodiments, the controller functionality described herein may be found within an application migration management module found within the cloud controller.

At block 410 resource data is monitored. The controller may monitor the resource data. The resource data may relate to resource capacities of the potential recovery computing devices or a primary computing device. The resource data may include memory capacities (e.g., available real or virtual memory), processor capacities (e.g., central processing unit capacities), a power/cooling capacities (e.g., available power flow/cooling ability), an operating system error factor, or a software error factor. Put differently, monitoring the resource data of the potential recovery computing devices may inform the controller of the composite capacities of the potential recovery computing devices and applications on those devices.

While monitoring the resource data, the controller may track the resource capacities of the potential recovery computing devices. In embodiments, the controller may have tracked those resource capacities for a period of time such as the previous week, month, year, or since initialization of the application. In embodiments, the resource capacities of the potential recovery computing devices change over time (e.g., before the triggering event) due to a plurality of application workloads being processed by the potential recovery computing devices. The controller may track these capacities by storing and evaluating memory and processing capacities. For example, the monitoring may include receiving a memory capacity of 10 megabytes at 04:52:00 on Sep. 24, 2014. The controller may store, track, and evaluate the capacities of the primary and recovery computing devices and the application resource usage/requirements. The evaluation may include a statistical analysis such as determining an upper and lower limit of the set of numerical values, calculating arithmetic means, arithmetic modes, standard deviations, linear regressions, or logarithmic functions. In embodiments the evaluation may be completed over a period of time as defined herein. The evaluation may be used in a later operation (e.g., a determination of a first or second recovery cluster at block 420 or 440, respectively). In this way the controller may be aware of both the current resource capacities and the trending of said capacities for the primary and recovery computing devices.

The controller may also monitor application resource requirements for the application. The application resource requirements may include processor requirements. The application resource requirements may also include memory requirements, whether virtual or real. Monitoring the application resource requirements may include verifying the current application resource requirements are sufficient and that the application is getting the required resources. For example, even if the primary computing device capacities have not changed, the controller may monitor performance of the application to verify the application can still perform as expected with the specified application resource requirements. If the application cannot perform as expected, the controller may modify the application resource requirements to reflect the changing needs of the application. In embodiments, memory and processor requirements may be user or system-entered values. In embodiments, the resource data may be used to establish the memory and processor requirements. For example, the controller may use the evaluation of the primary computing device to derive the processor requirement as the arithmetic mean of the processor usage by the application while on the primary computing device.

The controller may monitor a set of data used when running/processing the application. For example, the set of data may include personnel information which is used when operating a human resources application. The controller may monitor the set of data for changes in connectivity (e.g., the primary computing device losing some access to the set of data). The set of data may be external to (e.g., geographically separate from) both the potential recovery computing devices and the controller.

At block 420 a first recovery cluster is determined. The first recovery cluster may be determined by the controller. The controller may determine the first recovery cluster such that it can run the application after the triggering event. The recovery computing devices of the first recovery cluster may be a subset of the potential recovery computing devices.

The controller may use the available application resources (capacities) of the potential recovery computing devices to determine the first recovery cluster. In embodiments, available application resources are computing resources which are available in recovery computing devices to process the application workloads after a triggering event. The first recovery cluster may be determined such that it satisfies the application resource requirements. The controller may use the evaluation from block 410 to determine a combination of potential recovery computing devices which will satisfy the application resource requirements. For example, the controller may pull the evaluation for a second and third recovery computing device. The controller may identify that the sum of the capacities of the second recovery computing device and third recovery computing device meets the application resource requirements. Accordingly, the controller may establish the first recovery cluster with the second and third recovery computing devices. The controller may utilize potential recovery computing devices even if they have drastically different specifications or current capacities when compared to each other or the primary computing device.

At block 430, a first division of the single application instance is identified. The first division may divide the application into a first plurality of application instances. In embodiments, the number of application instances may equal the number of recovery computing devices in the first recovery cluster. In other embodiments, the controller may act to minimize the number of application instances, and may have less application instances than recovery computing devices. The controller may identify the capacity of each of the recovery computing devices within the first recovery cluster to aid in the division. The controller may use the tracked resource capacities of the recovery computing devices to identify these capacities. In embodiments, each application instance may be allotted for a specific recovery computing device, and the size of the division may account for the capacity of the specific recovery computing device. In embodiments, allotting an application instance for a specific recovery computing device is specifying which specific recovery computing device will run the application instance after the triggering event. For example, perhaps the first recovery cluster consists of servers A, B, and C. In this example, A and B have the same capacity while server C has twice as much capacity. Therefore, the controller may divide the application such that the application instance on C has 50% of the application workload while A and B both have 25%.

In certain embodiments, the controller may migrate the application in such a way that application instances are grouped together. For example, the triggering event may have impacted a computing device which ran three applications at the primary computing device. Perhaps in this example the first recovery cluster includes three recovery computing devices, and each of the recovery computing devices possesses enough resource capacities to process the application workloads of one of the applications. Therefore, the controller may split the workloads of the three applications among the three recovery computing devices so that no application is being processed by multiple recovery computing devices in separate application instances. In other embodiments, the controller may determine that some application instances may be grouped together while others cannot, and may act accordingly to group together those application instances it can. In embodiments, the migrated group of application instances are already in a data-sharing cluster on the primary computing device(s), and the controller preserves this data-sharing environment when migrating the group to the dynamically created recovery logical cluster. Grouping together application instances as such may lead to performance benefits.

At block 440, a second recovery cluster is determined. The second recovery cluster may be determined in response to the resource data being updated. In embodiments, the resource data may be updated through the monitoring from block 410. For example, if the application resource requirements changes to require more processing power or the resource capacities of potential recovery computing devices changes as a potential recovery computing device crashes, the controller may determine the second recovery cluster. The second recovery cluster may be comprised of multiple recovery computing devices selected from the potential recovery computing devices. The controller may determine the second recovery cluster based upon the capacities of the potential recovery computing devices after the updates. In certain embodiments, a second recovery cluster may also be determined if the triggering event has not been detected within a predetermined time frame (e.g., a minute, hour, day, week) of the first recovery cluster being determined.

In embodiments, the second recovery cluster is determined in essentially the same manner as the first recovery cluster. The controller may determine resource capacities of a recovery computing device. The controller may compare the resource capacities to the application resource requirements to see if the recovery computing device supports an application instance. If the recovery computing device can run an appreciable portion of the application, the controller may determine that the recovery computing device can support an application instance. In response to this determination, the controller may add the recovery computing device to the second recovery cluster. The controller may evaluate the recovery computing devices in many ways. For example, the controller may compare the resource capabilities of the potential recovery computing devices to the application resource requirements. While comparing, the controller may determine that the resource capacities surpass the application resource requirements. In response to this determination, the controller may start adding recovery computing devices to the second recovery cluster, starting with the recovery computing devices with the most available resource capacities, until the application resource requirements are met. Other methods for adding recovery computing devices are possible. The controller may continue adding recovery computing devices until the second recovery cluster can fully support and run the application.

In certain embodiments, a controller may use a threshold resource requirement to identify if a recovery computing device can support an application instance. The controller can create the threshold resource requirement using the application resource requirements. For example, the controller may set the threshold resource requirement as $1/10^{th}$ of the total application resource requirement. Using the threshold resource requirement, the controller may select a recovery computing device. For example, if a recovery computing device had available application resources which meet the threshold resource requirement, the controller may add the recovery computing device to the second recovery cluster.

At block 450, a second division of the application instance is identified. The controller may divide the single application instance into a second plurality of application instances. The second division may be identified in the same fashion as the first division. The controller may identify the resource capacities of each recovery computing device in the second recovery cluster. The controller may then determine an apportionment of the single application instance into the second plurality of application instances. The controller may then allot each application instance to a specific recovery computing device of the second recovery cluster.

At block 460, a triggering event is detected. The triggering event may relate to the ability of the primary computing device to process the application. In embodiments, the triggering event may relate to a decrease in available real memory, available virtual memory, or processing power which brings the resource capacities of the primary computing device to meet/fall under the application resource requirements. In another embodiment, the triggering event may related to a loss of at least some assess to a set of data for processing the application, rending the primary computing device unable to properly run the application. In embodiments, after the triggering event the application instance may not be available on the primary computing device.

Resource capacities may fall under the application resource requirements in multiple ways. For example, a controller may identify the current memory capacity of the primary computing device as 2 megabytes, which may fall below the application resource requirement for memory capacity of 3.5 megabytes, resulting in a triggering event. In certain embodiments, the triggering event can be identified by a heartbeat between the controller and the primary computing device. In embodiments, the heartbeat is a regular timed report on the status of the resource capacities of the primary computing device which is sent to the controller. The heartbeat may use agents on the primary computing device to provide reports on the resource data to the controller.

At block 470, the application is migrated. The controller may migrate the application as the second plurality of application instances as determined in block 450. The application may be migrated to the second recovery cluster as determined in block 440. The migration may occur in response to the triggering event from block 460.

In certain embodiments (e.g., after the application has already been migrated to the second recovery cluster), the controller may determine a third recovery cluster. The third recovery cluster may be determined as recovery clusters have been determined as described herein. The controller may determine the third recovery cluster in response to the resource data being updated. The third recovery cluster may be composed of a new plurality of potential recovery computing devices. The third recovery cluster may be determined such that it satisfies the application resource requirements. The controller may identify a third division of the application. The third division may be identified as divisions have been identified as described herein. The third division may be identified in response to the third recovery cluster being determined. The application may be divided into a third plurality of application instances, with each application instance allotted as described herein to a different recovery computing device. The controller may detect a new triggering event related to the ability of the second recovery cluster to process the application workload. In response to the new triggering event, the controller may migrate the third plurality of application instances to the third recovery cluster. In such embodiments, the controller may keep determining new recovery clusters to dynamically respond to the changing resource capacities of the recovery computing devices over time.

In embodiments, a data-sharing environment may be created. The data sharing environment may be created by the controller by a specific structure of the second recovery cluster. In certain embodiments, neither a data-sharing environment nor a logical clustering may have existed on the primary computing device. In certain embodiments, the controller may act as an access point for data and processing requests (e.g., client requests) within the data-sharing environment. As the access point, the controller might receive all data requests from the second plurality of application instances and all client requests from the client. The client requests might identify the application to be processed. In the advent of a client request, the controller may identify an application instance to receive the client request, and send said client request. In the advent of a data request, the controller may maintain a queue of data requests from the second plurality of application instances. In embodiments, the queue of data requests is an ordered list of the requests from the application instances to access a set of data for running the application. The data queue may contain those data requests which are identical. The controller may then merge the data requests.

By acting as an access point, the controller may route the processing requests to—and provide access to the set of data for—the devices within the data-sharing environment work (e.g., the second recovery cluster or the third recovery cluster). By sending all client requests and data requests through the controller, the second/third recovery cluster may be masked as a single recovery computing device (e.g., a single server) within the data-sharing environment. By creating a data-sharing environment, the controller may process an application even if the application is not written with data-sharing capacities.

In addition to this, by masking the recovery cluster as a single device, a client requesting processing of the application may only need the IP address and port of the controller. Allowing a client to send all requests directly to the controller may reduce the need for a client to retain the IP addresses and ports of all recovery computing devices and elect a specific recovery computing device for processing. Allowing a client to send all requests directly to the controller may also reduce the likelihood of numerous clients sending requests to a single overworked recovery computing device, leaving other recovery computing devices underutilized. Instead, the data-sharing environment allows the controller to dictate workloads to the recovery computing devices as desired.

Figure 5A:
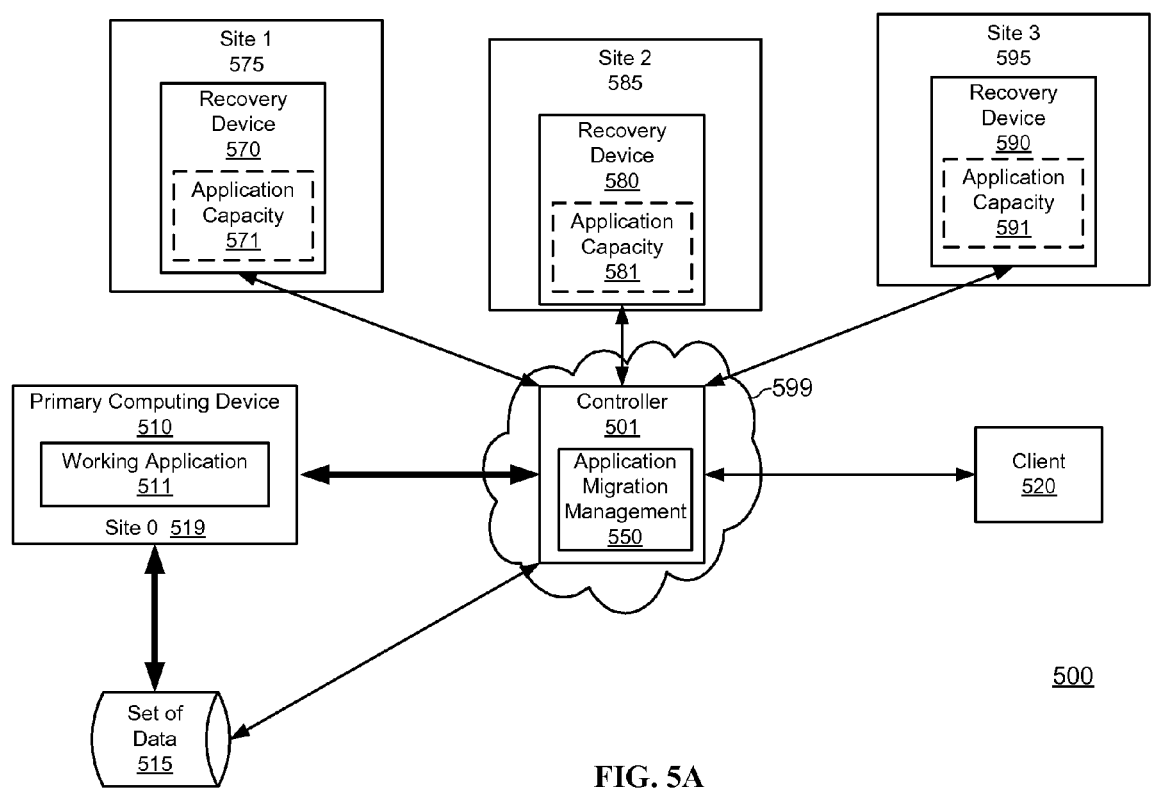
FIG. 5A depicts an embodiment of controller monitoring an application on a primary computing device and potential recovery computing devices before a triggering event related to processing power.

FIG. 5A shows a primary computing device 510 running a single application 511 at site zero 519. A client 520 may be sending client requests for the single application. The client requests may be sent to the primary computing device 510 by an application migration management module 550 within a controller 501. In embodiments, the controller 501 is a cloud controller, accessing the computing devices through a cloud computing environment 599. The primary computing device 510 may use a set of data 515 to process the application 511. The application migration management module 550 may monitor the primary computing device 510, the set of data 515, and three potential recovery computing devices: 570, 580, and 590. The primary computing device may not have a data-sharing environment. The lack of a data-sharing environment may result in the primary computing device lacking the capability to divide the application among other computing devices. The lack of a data-sharing environment also may result in an attempt to divide the processing ending with mismanagement of the set of data (e.g., overwritten files or unmerged parallel files).

The application migration management module 550 may monitor the application resource requirements for a first month. In embodiments, the application resource requirements may be derived from the application resource usage on the primary computing device. For example, the application migration management module 550 may determine that during the first month the primary computing device 510 processed an arithmetic mean of 10 million instructions per second (IPS). The controller 550 may also identify that during the first month the primary computing device 510 had a processing power lower limit of 7 million IPS and a processing power upper limit of 100 million IPS. Based on these numbers, the controller may determine an application resource requirement of processing 8 million IPS.

The controller 550 may determine a potential recovery cluster by identifying a combination of computing devices which can meet 8 million IPS. For example, while monitoring processing power during the first month, the controller 550 may determine that a recovery computing device 570 at site one 575 has the capacity 571 to process 7 million IPS. The application migration management module 550 may also determine that over a first month another recovery computing device 580 at site two 585 has the capacity 581 to process 3.5 million IPS. The application migration management module 550 may determine that the two recovery computing devices have a combined processing capacity of 10.5 million IPS, which meets 8 million IPS. Accordingly, the application migration management module 550 may determine a potential recovery cluster which includes the recovery computing devices 570 580 at site one 575 and two 585.

In embodiments, an application migration management module 550 may ascertain that in a second month the recovery computing device 570 at site one drops to an application resource capacity 571 of processing 2 million IPS. The application migration management module 550 may also ascertain that over the second month another recovery computing device 590 at site three 595 has an application resource capacity 591 to process 8 million IPS. Based upon the processor capacities in the second month, the application migration management module 550 may determine a potential recovery cluster which includes the recovery computing device 590 at site three 595 and the recovery computing device 580 at site two 585. In this way the determined recovery cluster 555 may change based upon the resource capacities over time.

Figure 5B:
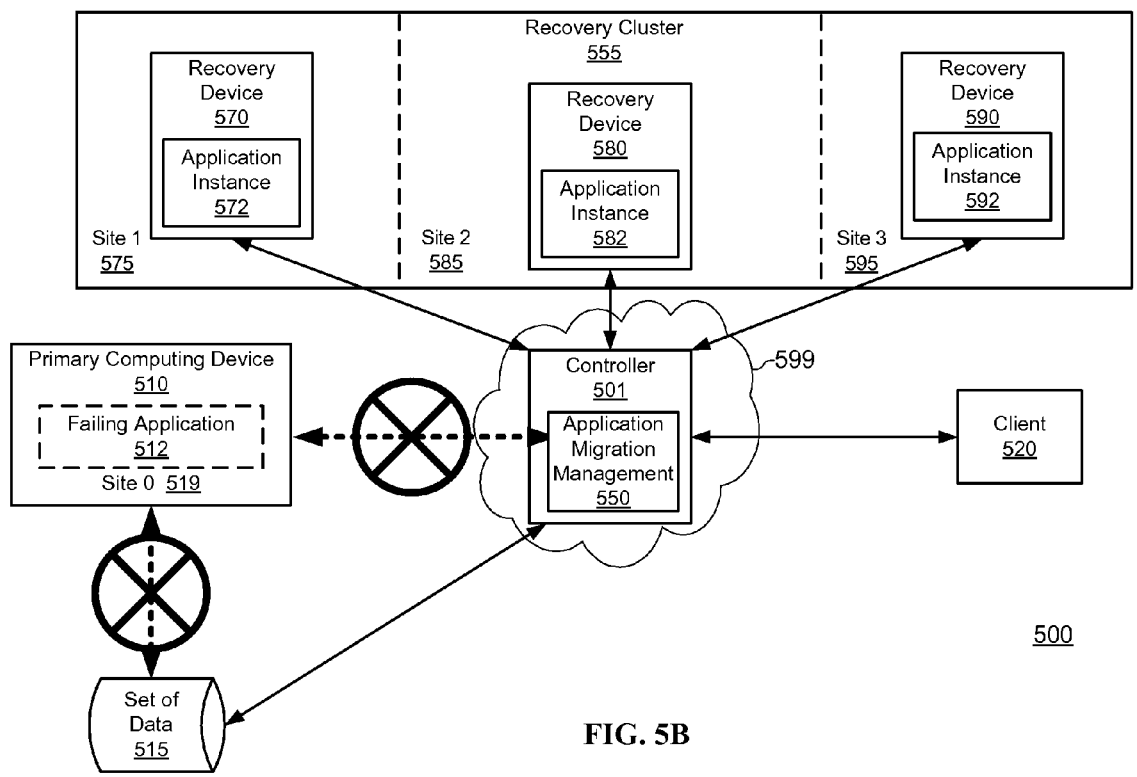
FIG. 5B depicts an embodiment of controller monitoring an application on recovery computing devices and a primary computing device after a triggering event related to processing power.

In FIG. 5B, the primary computing device 510 may experience a triggering event impacting the ability of the primary computing device 510 to process the application. The triggering event may be related to an application resource requirement of a processing capacity of 2 million IPS. The controller 550 may detect the primary computing device 510 dropping to a processing capacity of processing 1 million IPS, which the application migration management module 550 qualifies as a triggering event. The triggering event would result in application failing 512. In response to the triggering event, the application migration management module 550 may migrate to the plurality of application instances at the determined recovery cluster 555. If the triggering event occurred in the first month, the recovery cluster 555 may be the recovery computing device 570 at site one 575 and the recovery computing device 580 at site two 585. If the triggering event occurred in the second month, the recovery cluster 555 may be the recovery computing device 580 at site two 585 and the recovery computing device 590 at site three 595.

In embodiments, the recovery cluster 555 would be structured with a data-sharing environment. The data-sharing environment may send client requests and data requests through the application migration management module 550. Routing requests through the application migration management module 550 may mask the recovery cluster 555 as a single recovery computing device (e.g., it may make it look as if the application were being processed on a single server). Masking the recovery cluster 555 as a single device may result in improved data fidelity. Masking the recovery cluster 555 as a single device may also allow an application which was written to be processed by a single device to utilize the recovery cluster. Masking the recovery cluster 555 as a single recovery computing device may also allow a client 520 requesting data processing to only retain a single IP address and port (e.g., the IP address and port of the controller) for communication. Centralizing management under the application migration management module, both in terms of what data is accessed, what devices are processing the workloads, and when different and/or new devices can be leveraged, may result in improved data integrity and performance benefits across the recovery computing devices.

Figure 6A:
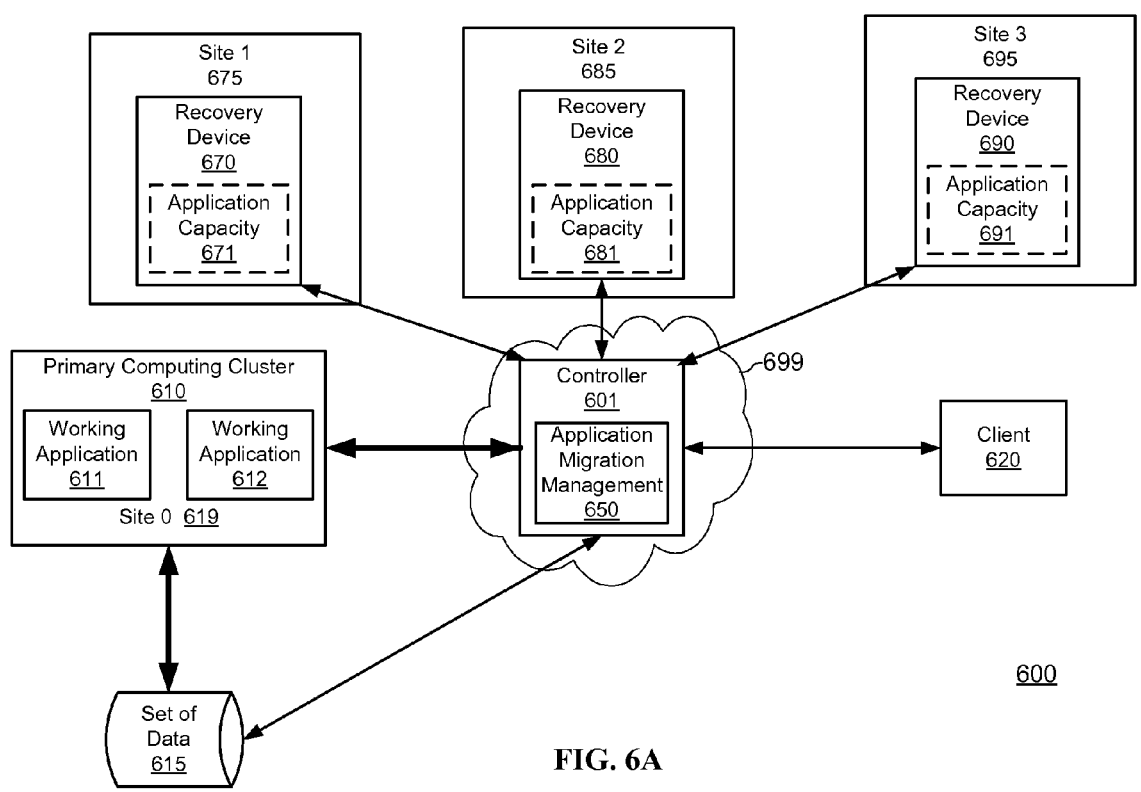
FIG. 6A depicts an embodiment of a controller monitoring a set of applications on a primary computing device and potential recovery computing devices before a triggering event related to memory.

FIG. 6A shows an embodiment of a plurality of applications 611 612 being processed on a primary cluster at site zero 619. A client 620 may be sending client requests for using the applications 611 612. The primary cluster 610 may use a set of data 615 to process the applications 611 612. An application migration management module 650 within a controller 601 may monitor and manage the computing devices and applications 611 612. In embodiments, the controller 601 is a cloud controller which accesses and manages the other computing devices through a network or cloud computing environment 699.

In the embodiment, the application migration management module monitors the memory capacity of the primary cluster 610 and the application resource requirement of twenty three megabytes of available memory. The application migration management module 650 may determine a recovery cluster 651 by identifying a combination of devices which can meet twenty three megabytes. For example, the application migration management module 650 may identify that, over a first month, a recovery computing device 670 at site one 675 has a memory capacity 671 of ten megabytes and a recovery computing device 681 at site two 685 has a memory capacity 681 of seventeen megabytes. Based upon the two memory capacities, the application migration management module 650 may determine a recovery cluster 651 which includes the two recovery computing devices.

Figure 6B:
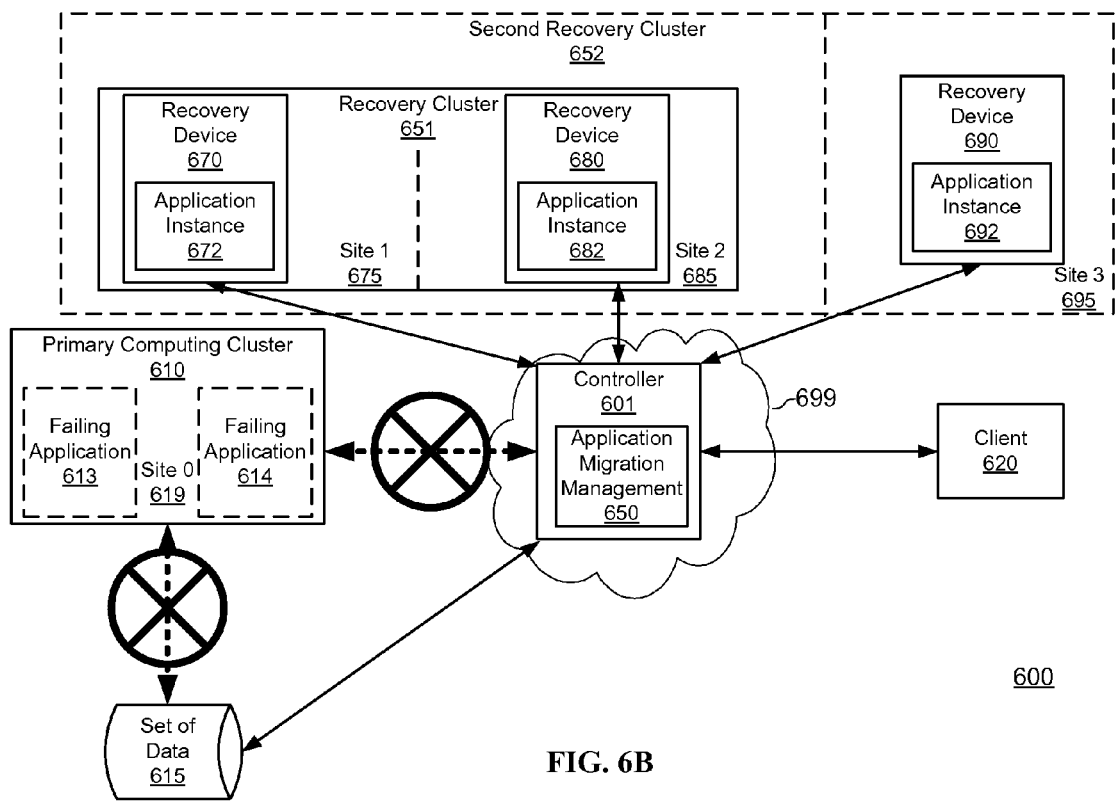
FIG. 6B depicts an embodiment of a controller monitoring a set of applications on recovery computing devices and a primary computing device after a triggering event related to memory.

In FIG. 6B, the application migration management module 650 may detect that the primary cluster 610 drops from twenty five megabytes to 0.0 megabytes of available memory. The change of the memory capacity may qualify as a triggering event. The triggering event may cause the applications to fail 613 614. As a result of this failure, the controller 601 may no longer be able to communicate with the applications 613 614, In response to the triggering event, the application migration management module 650 may migrate the set of application instances 672 682 to the recovery cluster 651. This is accomplished by extending the cluster of applications that existed in the primary computing device by creating a logical cluster for the set of recovery computing devices used in the recovery cluster. In the example above, the recovery cluster 651 may include the recovery computing devices 670 680 at site one 675 and site two 685.

After migrating in the first month, in a second month the application migration management module 650 may identify the memory capacity of the recovery computing device 670 at site two 675 dropping from ten megabytes to three megabytes. The drop in memory of the recovery computing device 670 may drop the memory of the recovery cluster 651 to twenty megabytes, which meets the threshold value of twenty three megabytes from the above example. Meeting the threshold value may constitute a second triggering event. The controller may also identify that over the second month a recovery computing device 690 at site three 695 has a memory capacity 691 of eight megabytes. In response to the second triggering event, the application migration management module 650 may determine a second recovery cluster 652 which includes the three recovery computing devices 670 680 690. The application migration management module may then migrate the set of application instances 672 682 692 to the second recovery cluster 652. In this way the application migration management module 650 may migrate the set of applications 611 612 to multiple clusters of devices over time in response to changing resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for migrating an application operating in a single application instance on a primary computing device to a recovery cluster, comprising:
    monitoring resource data that includes application resource requirements for the application and resource capacities of potential recovery computing devices;
    determining, based upon the resource capacities of the potential recovery computing devices, a first recovery cluster for the application that satisfies the application resource requirements;
    identifying, in response to determining a first recovery cluster, a first division of a single application instance into a first plurality of application instances;
    determining, in response to updates to the resource data, a second recovery cluster having recovery computing devices selected from the potential recovery computing devices;
    identifying, in response to determining a second recovery cluster, a second division of the single application instance into a second plurality of application instances;
    detecting a triggering event related to an ability of the primary computing device to process the application; and
    migrating the second plurality of application instances to the second recovery cluster in response to the triggering event.

2. The method of claim 1, wherein determining the second recovery cluster for the application includes:
   determining available application resources of a recovery computing device from the potential recovery computing devices;
   determining, by comparing the available application resources to the application resource requirements, that the recovery computing device supports an application instance; and
   adding the recovery computing device to the second recovery cluster in response to the recovery computing device supporting the application instance.

3. The method of claim 2, wherein supporting the application instance by the recovery computing device includes:
   creating, using the application resource requirements, a threshold resource requirement for the recovery computing device; and
   selecting, for the second recovery cluster, the recovery computing device based upon available application resources of the recovery computing device meeting the threshold resource requirement.

4. The method of claim 1, further comprising:
   receiving, by the controller, a client request identifying the application;
   identifying, in response to the client request, an application instance from the second plurality of application instances; and
   sending the client request to the application instance.

5. The method of claim 1, further comprising sharing access of the second plurality of application instances to data by:
   receiving data requests from the second plurality of application instances;
   maintaining, based upon portions of data in the data requests being identical, a queue of the data requests from the second plurality of application instances; and
   merging the data requests in the queue of the data requests.

6. The method of claim 1, wherein identifying a second division of the single application instance into a second plurality of application instances includes:
   identifying resource capacities of each of the recovery computing devices of the second recovery cluster;
   determining, using the resource capacities of each of the recovery computing devices, an apportionment of the single application instance into the second plurality of application instances; and
   allotting, based upon the resource capacities of each of the recovery computing devices, each application instance to a specific recovery computing device of the second recovery cluster.

7. The method of claim 1, wherein updates to the resource data include changes in at least one of:
   the application resource requirements; and
   the resource capacities of the potential recovery computing devices.

8. The method of claim 1, wherein the application is not written to share access to data as a plurality of application instances.

9. The method of claim 1, wherein the triggering event includes occurrences selected from a group consisting of at least one of:
   a drop in available real memory;
   a drop in available virtual memory;
   a drop in available processing power; and
   a loss of at least some access to a set of data for processing the application.

10. The method of claim 1, further comprising:
    determining, in response to updates to the resource data, a third recovery cluster for the application which can satisfy the application resource requirements, the third recovery cluster having a new plurality of recovery computing devices selected from the potential recovery computing devices;
    identifying, in response to determining a third recovery cluster, a third division of the single application instance into a third plurality of application instances, with each application instance allotted to a recovery computing device of the third recovery cluster;
    detecting a new triggering event related to an ability of the second recovery cluster to process the application; and
    migrating the third plurality of application instances to the third recovery cluster in response to the new triggering event.

11. The method of claim 1, further comprising the potential recovery computing devices processing a plurality of application workloads before the triggering event.

12. The method of claim 1, wherein a set of data for processing the application is located on one or more devices which are geographically external to both the primary computing device and the potential recovery computing devices.

13. The method of claim 1, wherein operations of the method are performed by a controller which is located on one or more devices which are geographically external to both the primary computing device and the potential recovery computing devices.

14. The method of claim 1, wherein monitoring resource data includes gathering application resource usage statistics over a period of time when the application is being processed on the primary computing device.

15. The method of claim 1, wherein a recovery computing device from the potential recovery computing devices has different memory and processing capacities than the primary computing device.

16. A system for migrating an application operating in a single instance on a primary computing device to a recovery cluster, the system comprising:
    a primary computing device;
    one or more recovery computing devices;
    a memory;
    one or more processing circuits communicatively coupled to the memory, the one or more processing circuits are configured to:
      monitor resource data that includes application resource requirements for the application and resource capacities of potential recovery computing devices;
      determine, based upon the resource capacities of the potential recovery computing devices, a first recovery cluster for the application that satisfies the application resource requirements, the first recovery cluster including a first set of recovery computing devices from the potential recovery computing devices;
      identify, in response to determining a first recovery cluster, a first division of the single application instance into a first plurality of application instances;
      determine, in response to updates to the resource data, a second recovery cluster having recovery computing devices selected from the potential recovery computing devices, the second recovery cluster including a second set of recovery computing devices from the potential recovery computing devices;

identify, in response to determining a second recovery cluster, a second division of the single application instance into a second plurality of application instances;

detect a triggering event related to the ability of the primary computing device to process the application; and migrate the second plurality of application instances to the second recovery cluster in response to the triggering event.

17. The system of claim 16, wherein the one or more processing circuits are configured to determine the second recovery cluster for the application, wherein being configured to determine the second recovery cluster for the application includes being configured to:

determine available application resources of a recovery computing device from the potential recovery computing devices;

determine, by comparing the available application resources to the application resource requirements, that the recovery computing device supports an application instance; and match the recovery computing device to the application instance in response to the recovery computing device supporting the application instance.

18. The system of claim 17, wherein supporting the application instance by the recovery computing device includes the one or more processing circuits being configured to:

create, using the application resource requirements, a threshold resource requirement for the application instance; and select, for the second recovery cluster, a recovery computing device based upon available application resources of the recovery computing device meeting the threshold resource requirement.

19. The system of claim 16, wherein the one or more processing circuits are further configured to create a data-sharing network, wherein being configured to create a data-sharing network includes being configured to identify, in response to a client request identifying the application, an application instance from the second plurality of application instances;

send the client request to the identified application instance;

determine that portions of data in data requests from the second plurality of application instances are identical;

maintain, based upon determining that portions of data in data requests are identical, a queue of the data requests; and merge the queue of the data requests.

20. A computer program product for migrating an application operating in a single instance on a primary computing device to a recovery cluster, the computer program product disposed upon a computer readable storage medium, the computer program product comprising computer program instructions that, when executed by a computer processor of a computer, cause the computer to carry out the steps of:

monitor resource data that includes application resource requirements for the application and resource capacities of potential recovery computing devices;

determine, based upon the resource capacities of the potential recovery computing devices, a first recovery cluster for the application that satisfies the application resource requirements;

identify, in response to determining a first recovery cluster, a first division of the single application instance into a first plurality of application instances;

determine, in response to updates to the resource data, a second recovery cluster having recovery computing devices selected from the potential recovery computing devices;

identify, in response to determining a second recovery cluster, a second division of the single application instance into a second plurality of application instances;

detect a triggering event related to the ability of the primary computing device to process the application; and migrate the second plurality of application instances to the second recovery cluster in response to the triggering event.

* * * * *